(12) United States Patent
Wen

(10) Patent No.: US 7,721,622 B2
(45) Date of Patent: May 25, 2010

(54) VEHICLE USED HANDLE

(76) Inventor: Chester Wen, 235 Chung-Ho Box 8-24, Taipei (TW)

( * ) Notice: Subject to any disclaimer, the term of this patent is extended or adjusted under 35 U.S.C. 154(b) by 365 days.

(21) Appl. No.: 11/807,615

(22) Filed: May 31, 2007

(65) Prior Publication Data

US 2008/0295639 A1     Dec. 4, 2008

(51) Int. Cl.
*G05G 1/04* (2006.01)
(52) U.S. Cl. ........................................ 74/523
(58) Field of Classification Search ................ 74/502.2, 74/519, 523, 524, 525, 543, 544
See application file for complete search history.

(56) References Cited

U.S. PATENT DOCUMENTS 5,123,768 A * 6/1992 Franklin ...................... 403/96

2005/0204856 A1 * 9/2005 Clark ........................... 74/522

* cited by examiner

*Primary Examiner*—Vicky A Johnson

(57) ABSTRACT

A handle device comprises a handle unit having a holding end at one end thereof; another end of the handle unit being an adjusting end; a center of the adjusting end having a penetrating hole; a frame having a pivotal seat; a pivotal groove being formed in the pivotal seat; a center of the pivotal groove being formed with a through hole; a twisting unit being assembled in the pivotal groove; a supporting block being installed between the adjusting end of the handle unit and the pivotal seat of the frame; the supporting block being a disk like structure. In assembly, the twisting unit is installed in the pivotal seat; the supporting block is installed upon the twisting unit. The supporting block is pivotally rotatable by the twisting rotation of the twisting unit; and the supporting block is engaged to the adjusting end.

2 Claims, 5 Drawing Sheets

VEHICLE USED HANDLE

FIELD OF THE INVENTION

The present invention relates to handles, and particularly to a vehicle used handle, which has a concrete, rigid and stable structure.

BACKGROUND OF THE INVENTION

A vehicle used handle is very important under the consideration of driving safety. In one prior art, a braking handle is disclosed, in that a securing unit is installed to an oil pressure braking system. The securing unit is used as a fulcrum for rotation from a loosing position to a braking position so as to drive a driving rod of a control pump to have the effect of braking. The braking handle has a seat having a supporting shaft. The securing unit passes through the shaft. The shaft is used as a fulcrum. A transversal assembly hole is formed in the shaft. The assembly hole has an opening facing to the pump. A spring is assembled to the assembly hole of the seat. A control block is assembled to the assembly hole and is resisted against by a spring. A control rod is installed in the control block and protrudes from the opening. The control rod resists against the driving rod. A seal block is installed to the opening of the seat for sealing the assembly hole.

However the prior art braking handle resists against a pneumatic device by using a thread rod for providing a push force in braking. Therefore, the bicycle braking handle has a hollow structure. Not only the structure of the handle is weak and the handle is easy to break due to external force. Especially, in track emergency, the vehicle is easy to fall down and thus the handle deforms and can not be used. Furthermore, the prior art handle only adjusts in horizontal direction and cannot be used longitudinally. Therefore, the user will feel uneasy.

Thereby there is an eager demand for a novel design which can improve the prior art defect and provides more perfect functions to user.

SUMMARY OF THE INVENTION

Accordingly, the primary object of the present invention is to provide a vehicle used handle, which has a concrete, rigid and stable structure.

To achieve above objects, the present invention provides a handle device which comprises a handle unit having a holding end at one end thereof; another end of the handle unit being an adjusting end; a center of the adjusting end having a penetrating hole; a frame having a pivotal seat; a pivotal groove being formed in the pivotal seat; A center of the pivotal groove being formed with a through hole; a twisting unit being assembled in the pivotal groove; and the twisting unit being an elastic spring; a supporting block being installed between the adjusting end of the handle unit and the pivotal seat of the frame; the supporting block being a disk like structure. In assembly, the twisting unit is installed in the pivotal seat; the supporting block is installed upon the twisting unit that the supporting block is pivotally rotatable by the twisting rotation of the twisting unit; and the supporting block is engaged to the adjusting end.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
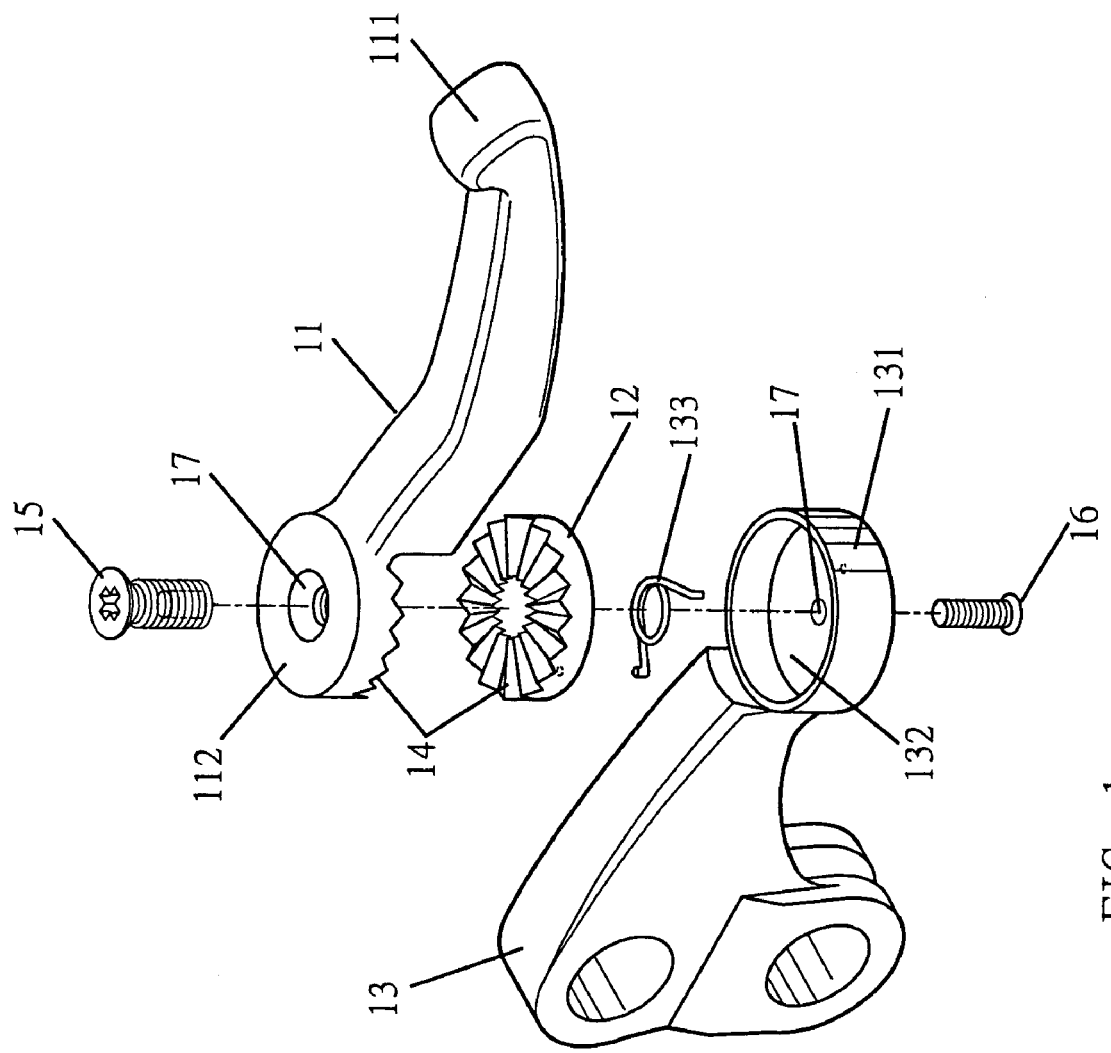
FIG. 1 is an explosive schematic view of the handle device of the present invention.
Figure 2:
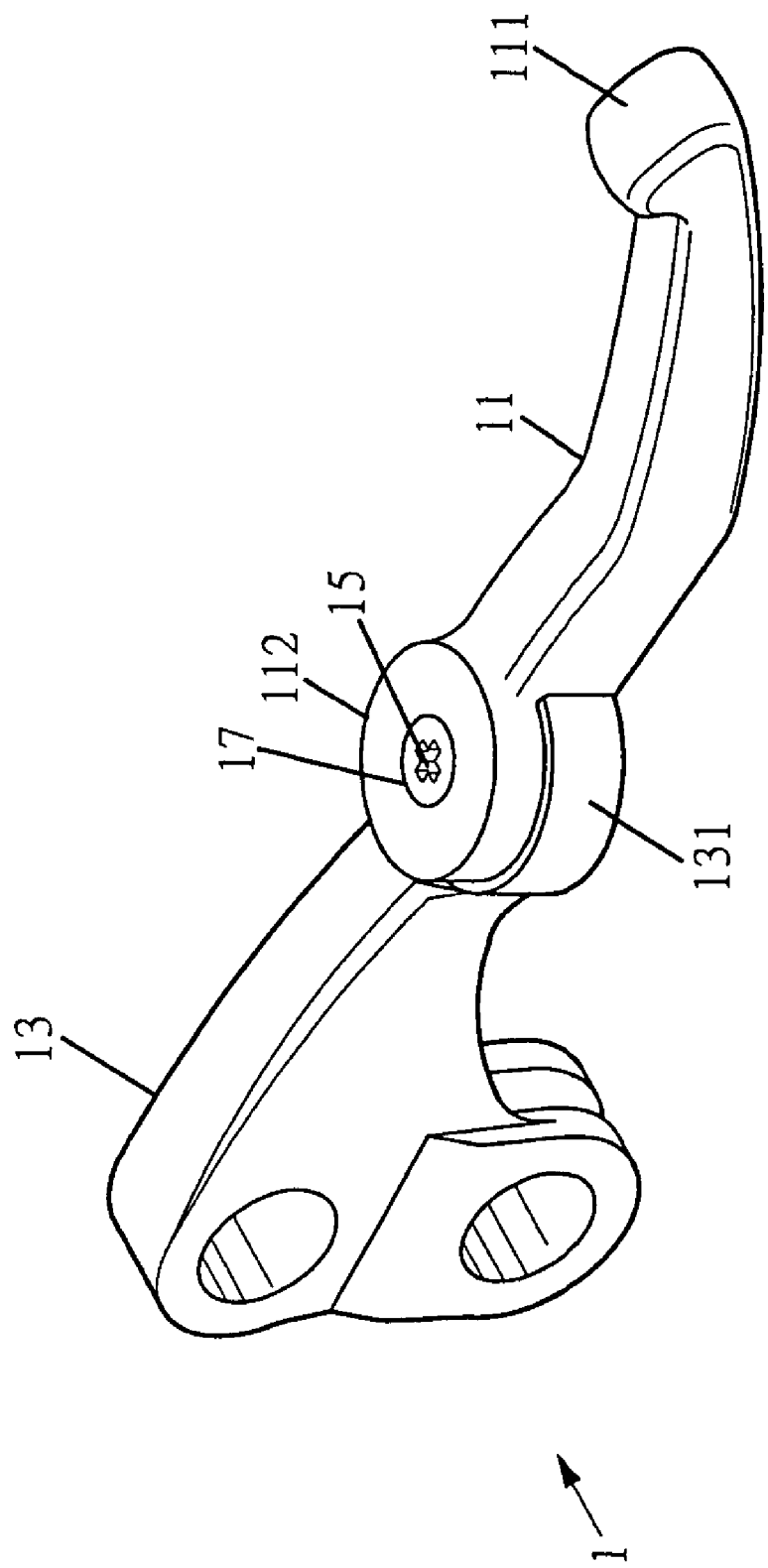
FIG. 2 is a schematic cross sectional view of the handle device of the present invention.
Figure 3:
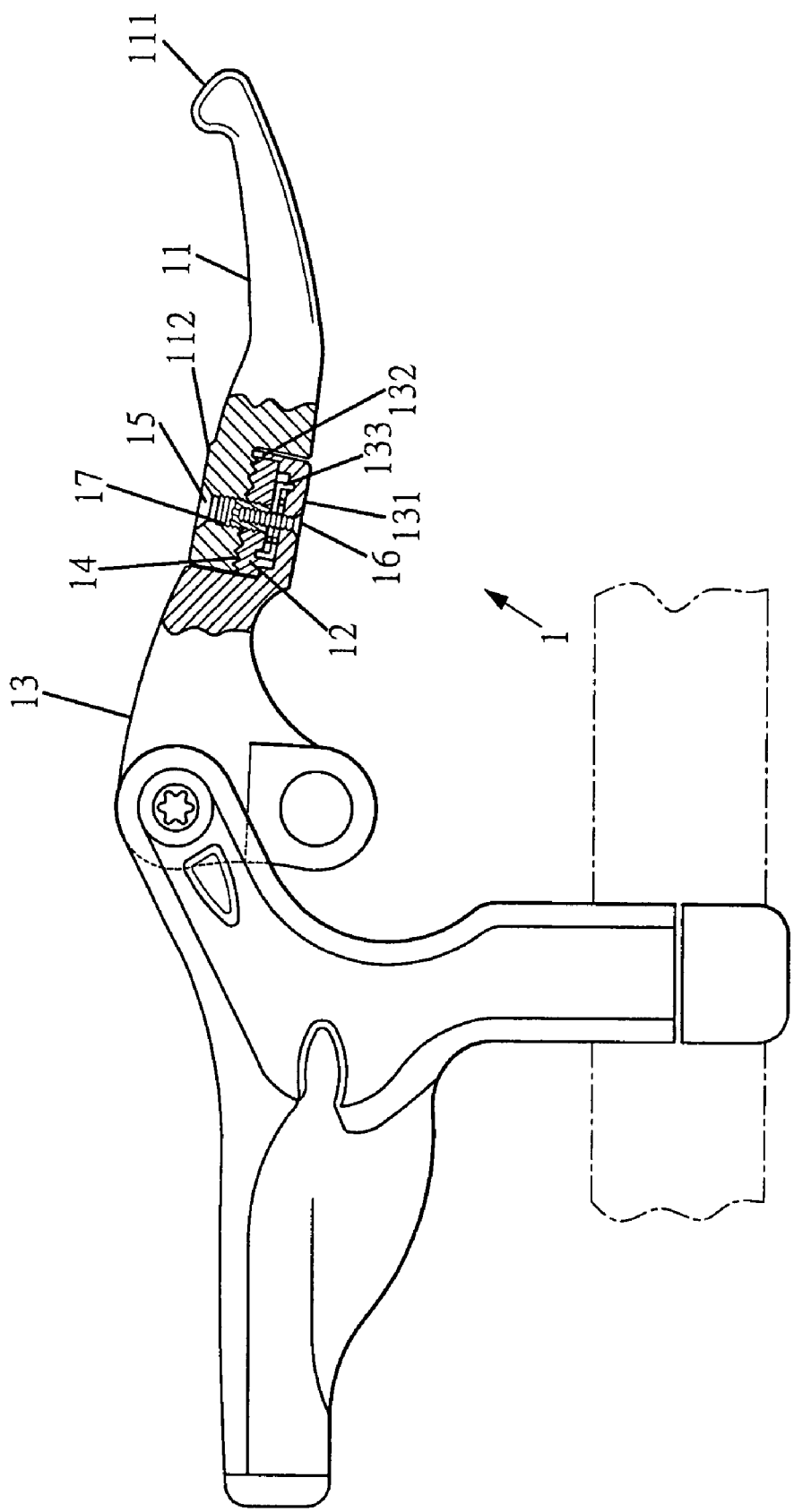
FIG. 3 is a schematic view showing the operation of the present invention.

Referring to FIGS. 1 to 3, the handle device of the present invention is illustrated. The handle device 1 has a frame 13 and a handle 11 mounted on the frame 13.

The handle 11 has a holding end 111 at one end thereof. Another end of the handle 11 is an adjusting end 112. A center of the adjusting end 112 has a penetrating hole 17.

The frame 13 has a pivotal seat 131. A pivotal groove 132 is formed in the pivotal seat 131. The pivotal groove 132 has an approximate round shape. A center of the pivotal groove 132 is formed with a through hole 171. A twisting unit 133 is assembled in the pivotal groove 132. The twisting unit 133 is a torsion spring.

A supporting block 12 is installed between the adjusting end 112 of the handle 11 and the pivotal seat 131 of the frame 13. The supporting block 12 is in a disk-shaped. One surface of the supporting block 12 is formed as a round teethed block 14 which serves to contact with the adjusting end 112. A surface of the adjusting end 112 is also formed with a round teethed block 14 corresponding to the round teethed block 14 of the supporting block 12. Contact surfaces of the pivotal seat 131 and the supporting block 12 are planar.

Referring to FIG. 2, the assembly of the present invention is illustrated. The twisting unit 133 is installed in the pivotal seat 131. The supporting block 12 is installed upon the twisting unit 133 so that the supporting block 12 can pivotally rotate by the twisting rotation of the twisting unit 133. The supporting block 12 is installed to the adjusting end 112 of the handle 11 by the round teethed block 14 of the supporting block 12 to contact to the round teethed block 14 of the adjusting end 112. A female stud 15 passes through the penetrating hole 17 of the adjusting end 112 and a male stud 16 passes through the through hole 171 of the pivotal groove 132. Then the male stud 16 is screwed to the female stud 15. Thus the handle 11, supporting block 12 and frame 13 are engaged.

When the rotation angle of the handle 11 with respect to the frame 13 is to be adjusted, the female stud 15 is released from the male stud 16. The pivotal angle of the handle 11 with respect to the supporting block 12 is changeable. Furthermore, since the twisting unit 133 is assembled in the pivotal groove 132 and the round teethed block 14 of the supporting block 12 is assembled to the round teethed block 14 of the adjusting end 112, when the twisting unit 133 is twisted, the handle 11 will rotate with respect to the frame 13 pivotally. When no external force is applied, by the resilient force, the twisting unit 133 will return and the handle 11 return to the original position.

Figure 4:
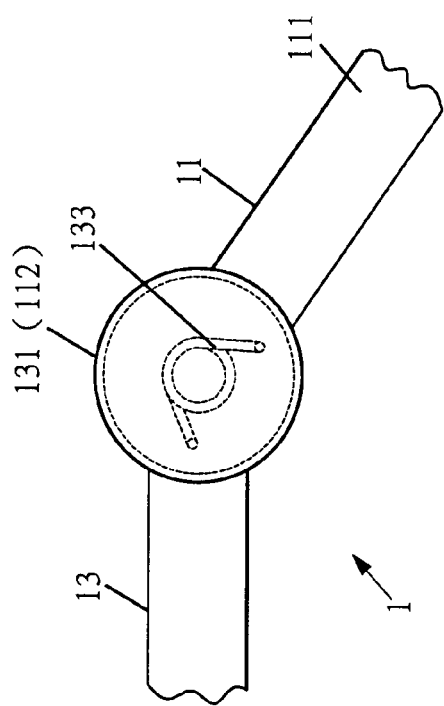
FIGS. 4 and 5 are schematic views showing the angle change of the handle device according to the present invention.
Figure 5:
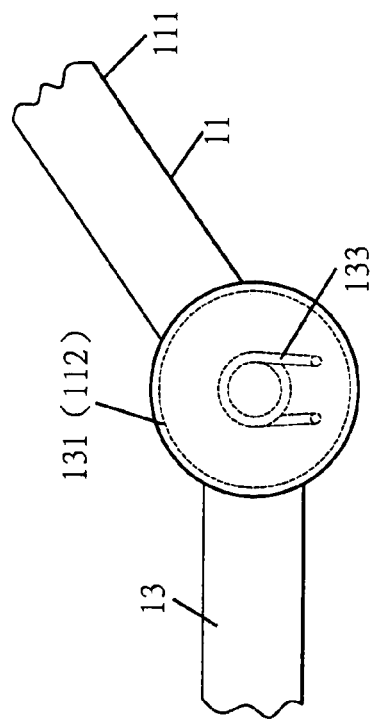

Referring to FIGS. 3 and 4, the female stud 15 is tightly engaged to the male stud 16. The handle 11, supporting block 12 and the frame 13 are tightly engaged. When the handle 11 is driven or collided, the handle 11 and the supporting block 12 are tightly engaged by the round teethed blocks 14. Thus, the driving force is applied to the twisting unit 133 by pivotally rotation thereof. When the twisting unit 133 deforms, since one end of the twisting unit 133 is assembled to the pivotal groove 132 and another end thereof is assembled to the supporting block 12, the supporting block 12 is pivotal rotated with respect to the pivotal groove 132. The supporting block 12 is tightly engaged to the handle 11. Therefore, the handle 11 is pivotally rotated with respect to the frame 13 so that the handle 11 will not break. When the external force applied to the handle 11 disappears, the twisting unit 133 will resilient to rotate reversely to the original position. Then the handle 11 returns with respect to the frame 13.

Figure 6:
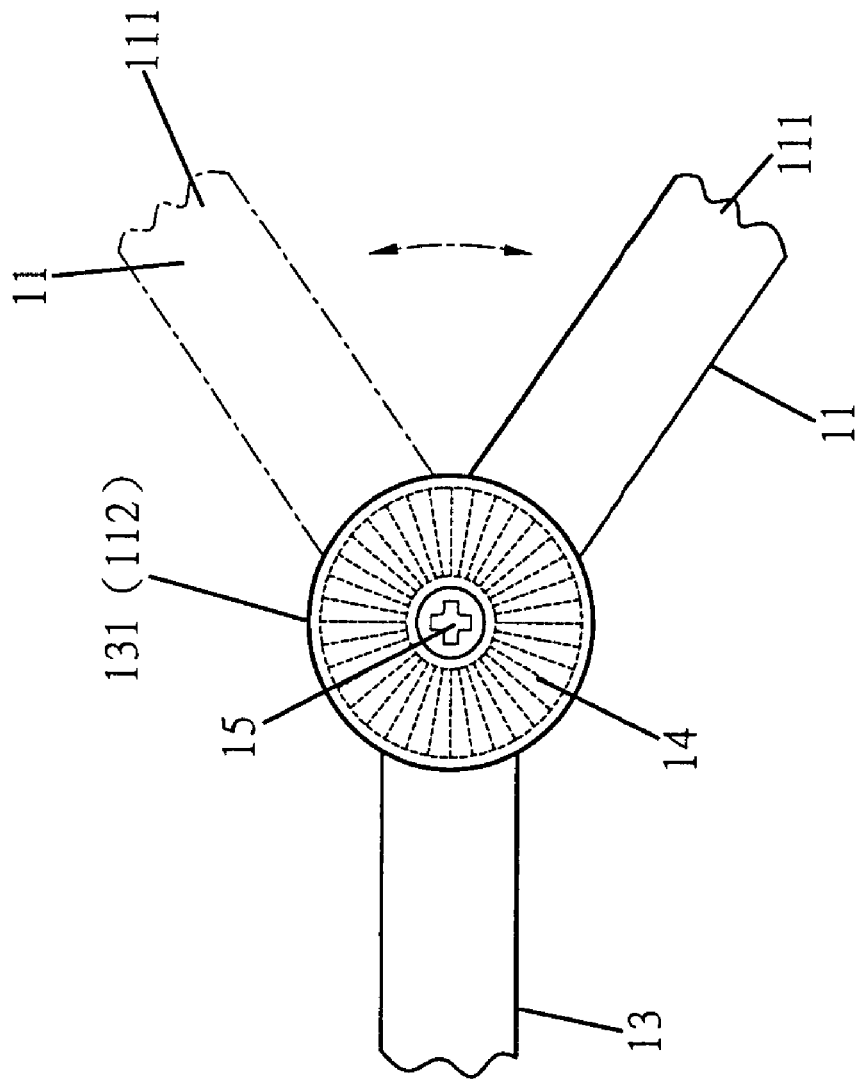
FIG. 6 is a schematic view showing the orientation adjustment of the handle device with respect to the supporting block.

Referring to FIG. 6, when the user desires to change the pivotal angle of the handle 11 with respect to the frame 13, the female stud 15 is released from the male stud 16, so that a gap is formed between the supporting block 12 and the handle 11. Then the handle 11 is pivotal rotated with respect to the supporting block 12. When it is rotated to a predetermined orientation, the female stud 15 is further engaged to the male stud 16. By the engagement of the round teethed block 14 of the supporting block 12 and the round teethed block 14 of the adjusting end 112, the orientation of the handle 11 with respect to the frame 13 is changed.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A handle device comprising:
    a handle unit having a holding end at one end thereof; another end of the handle unit being an adjusting end; a center of the adjusting end having a penetrating hole;
    a frame having a pivotal seat; a pivotal groove being formed in the pivotal seat; a center of the pivotal groove being formed with a through hole; a twisting unit being assembled in the pivotal groove; and the twisting unit being a torsion spring;
    a supporting block being installed between the adjusting end of the handle unit and the pivotal seat of the frame; the supporting block being in a disk-shaped; contact surfaces of the pivotal seat and the supporting block being planar, the supporting block having a round teethed block formed on a surface thereof for contacting with the adjusting end, the adjusting end having a round teethed block formed on a surface thereof and corresponding to the round teethed block of the supporting block; and
    a female stud passing through the penetrating hole of the adjusting end, a male stud passing through the through hole of the pivotal groove, the male stud screwed to the female stud for engaging the handle unit, the supporting block and the frame;
    wherein in assembly, the twisting unit is installed in the pivotal seat; the supporting block is installed upon the twisting unit that the supporting block is pivotally rotatable by the twisting rotation of the twisting unit; and the supporting block is engaged to the adjusting end of the handle unit; when the twisting unit is twisted the handle is rotated with respect to the frame pivotally.

2. The handle device as claimed in claim 1, wherein the pivotal groove has an approximate round shape.

* * * * *